(12) United States Patent
Heckmann

(10) Patent No.: US 6,460,661 B1
(45) Date of Patent: Oct. 8, 2002

(54) ELECTRICAL BRAKE HAVING A HOLDING BRAKE FUNCTION

(75) Inventor: Hans Heckmann, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/399,722

(22) Filed: Sep. 20, 1999

(30) Foreign Application Priority Data

Sep. 21, 1998 (DE) .......................... 198 43 123

(51) Int. Cl.[7] .................. H02K 49/00; F16D 65/21; F16D 65/18; H02P 6/00
(52) U.S. Cl. ................ 188/158; 188/265; 188/72.1; 188/162; 303/20; 303/89
(58) Field of Search .................. 188/156, 157, 188/158, 159, 160, 161, 162, 18 A, 265, 72.1, 72.8; 303/20, 89, 122; 310/77, 105; 318/382

(56) References Cited

U.S. PATENT DOCUMENTS

| | | | | |
|---|---|---|---|---|
| 3,641,375 A | * | 2/1972 | Moyer | 310/105 |
| 4,035,708 A | * | 7/1977 | Schaff | 318/696 |
| 4,095,332 A | * | 6/1978 | Linkous | 29/598 |
| 4,169,990 A | * | 10/1979 | Lerdman | 318/138 |
| 4,941,553 A | * | 7/1990 | Harrison | 188/156 |
| 5,111,091 A | * | 5/1992 | Bahn | |
| 5,646,848 A | * | 7/1997 | Walenty | 364/426.01 |
| 5,829,557 A | * | 11/1998 | Halasy-Wimmer | 188/162 |
| 5,915,504 A | * | 6/1999 | Doricht | 188/72.1 |
| 6,148,967 A | * | 11/2000 | Huynh | 188/164 |
| 6,179,097 B1 | * | 1/2001 | Schumann | 188/162 |
| 6,270,172 B1 | * | 8/2001 | Shirai et al. | 303/20 |
| 6,291,951 B1 | * | 9/2001 | Baulier | |

FOREIGN PATENT DOCUMENTS

| | | |
|---|---|---|
| DE | 24 14 602 | 10/1975 |
| DE | 43 14 211 | 11/1994 |
| DE | 195 11 287 | 1/1996 |
| DE | 196 15 186 | 8/1997 |
| DE | 196 11 911 | 10/1997 |
| DE | 19843123 | * 4/2000 |
| JP | 405300724 | * 11/1993 |

* cited by examiner

Primary Examiner—Douglas C. Butler
(74) Attorney, Agent, or Firm—Kenyon & Kenyon

(57) ABSTRACT

An electrical brake with a holding function, in particular for an electromechanical brake in motor vehicles, is described. The brake contains an electric motor having a holding brake function. To generate the holding brake function, an electric motor with salient stator poles and rotor poles is provided. The motor is acted upon by a defined holding current in such a way that the poles of the motor thereby are brought into a locked position and held there, or are held in a locked position. Advantageously, after activation of the holding brake function and after a locked position has been reached, the current delivered to the motor for braking is very substantially decreased. The electrical brake can optionally act on the brake caliper with a spindle and a linkage, the electric motor driving and braking the spindle.

12 Claims, 1 Drawing Sheet

ELECTRICAL BRAKE HAVING A HOLDING BRAKE FUNCTION

FIELD OF THE INVENTION

The present invention relates to an electrical brake and in particular an electromechanical brake for motor vehicles, the brake being implemented by way of an electric motor and being equipped with a holding brake function.

BACKGROUND INFORMATION

An electrical brake, and in particular an electromechanical brake for motor vehicles that is implemented by way of an electric motor and is equipped with a holding brake function, is known. In known electromechanical brakes, in which the electric motor applies the brake caliper optionally via a spindle and a linkage, this holding brake function is implemented by the fact that a separate holding brake is added onto the motor. This immobilizes the rotor and thus the spindle on which the electric motor acts. In direct-current motors such as those predominantly used today for electromechanical brakes, the holding brake is implemented by way of a frictional engagement brake that is controlled via an electromagnetic coupling and acts on the rotor shaft. If the motor torque is to be held, the coupling is closed and the rotor is immobilized by way of the friction of the brake linings.

One particular problem with the known electromechanical brakes is the fact that the electric motor becomes thermally overloaded if the motor's rotor is to be immobilized in a position and a large current is flowing. Such is the case in particular if the brake is actuated for a long period, for example if the driver of a motor vehicle keeps his or her foot pressed on the brake. In order to prevent this risk of electrical and thermal overload, the aforesaid separate holding brake is added onto the motor. When the rotor of this motor is retained by the mechanical brake, the motor current can be switched off. Before the motor rotates further, the holding brake is released and the motor can again be energized. In the example mentioned above, in which the holding brake is realized by way of an electromagnetically actuated frictional engagement brake, the motor can be switched to zero current once the holding brake has been activated. When the motor once again needs to rotate, the frictional engagement is disengaged via the coupling and the rotor is released. As a result, a situation can occur in an overlap period such that the electric motor is energized while the retaining brake is still engaged. This results in increased wear on the brake linings. In the control system, this results in dynamic losses and undesirable dead times if this overlapping state is to be prevented by way of control technology.

SUMMARY OF THE INVENTION

The electrical brake according to the present invention has, in contrast, the advantage of making available thermal relief for the motor without an additional holding brake. There are no dead times for the control system during activation and release of the holding brake function. Furthermore, there is no overlap between motor energization and immobilization of the electric motor by the holding brake. Reliability is enhanced by the elimination of components, the mechanical drive design is simplified, and there is a reduction in actuator mass and a decrease in overall volume.

For this purpose, in the electrical brake according to the present invention an electric motor with salient stator poles and rotor poles is provided in principle to generate the holding brake function, and the electric motor is acted upon by a defined holding current in such a way that the poles of the motor thereby are brought into a locked position and held there, or are held in a locked position.

According to a particularly advantageous embodiment of the present invention, upon activation of the holding brake function and after a locked position has been reached, the current delivered to the motor for braking, i.e. the braking current or motor current, is thereafter very substantially decreased. This ensures in all cases that the motor is not thermally overloaded when the holding brake function is activated. The holding current may be substantially less than the regulated maximum current, in particular less than 10% thereof.

According to an advantageous embodiment of the brake according to the present invention, provision is made for a reluctance motor or an electronically commutated direct-current motor to be provided as the electric motor.

In a further advantageous embodiment of the present invention, provision is made for the electrical brake to act via a spindle and optionally a linkage on the brake caliper, the electric motor operating on the spindle.

In an advantageous method for operating an electrical brake that possesses a braking motor having a holding brake function, the object of the present invention is achieved by the fact that when the braking current is applied for a long period, the holding function is activated and the electric motor is acted upon with a defined holding current in such a way that the poles of the motor thereby are brought into a locked position and held there, or are held in a locked position.

In a further advantageous embodiment of this method, provision is made that when the holding brake function is activated and once a locked position has been reached, the current delivered to the motor for braking, i.e. the braking current or motor current, is very substantially decreased, in particular to the holding current.

The brake configured according to the present invention, and the method according to the present invention, are advantageously used in an arrangement in which the brake is used on those spindles, axles, or wheels on which no provision is made for a parking brake or handbrake to act. This is of particular importance in an operating situation in which the parking brake, generally known as the handbrake, is also implemented with the holding brake, since in such a case a separate holding brake cannot be dispensed with; however, the latter need to be provided only on those wheels on which the parking brake or handbrake acts, for example only on the rear wheels. The other wheels then need no mechanical holding brake as is the case in the existing art.

BRIEF DESCRIPTION OF THE DRAWING

The FIGURE schematically shows, in a sectioned illustration, a reluctance motor having rotor poles and stator poles, and the windings applied on the stator poles.

DETAILED DESCRIPTION

Figure 1:
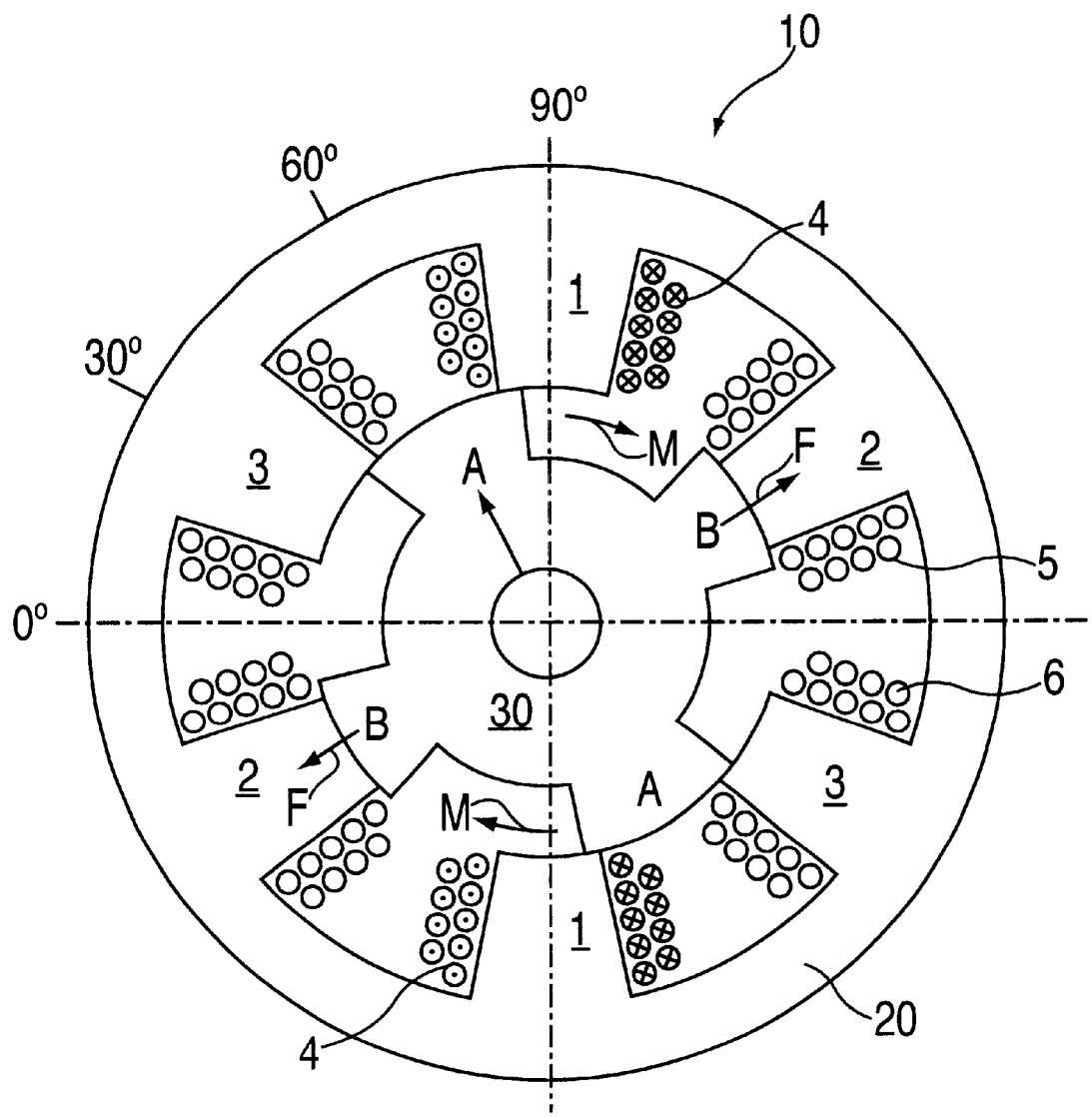

As shown in the FIGURE, a reluctance motor 10 has a stator 20 and a rotor 30. Stator 20 in turn contains three pole pairs 1, 2, and 3, the respective poles belonging to a pole pair being located at 180° opposite one another. These poles are equipped with coils 4, 5, and 6. Coil 4 is drawn with the current flow direction, in order to show that when, in this position depicted in the FIGURE, this coil 4 is energized around pole pair 1, a starting torque M, corresponding to the arrow depicted, is created. This starting torque M causes rotor 30 to rotate to the right. In the example depicted, rotor 30 is equipped with two pole pairs A and B which are also located at 180° opposite one another. The fact that coils 4 and 5 are continuously supplied with current thus generates a rotary field with which rotor 30 is rotated to the right in the direction of arrows M.

If motor 10 is energized only in coil of pole 2, as in the depiction of the FIGURE, a force F is then created which acts on pole pair B. In this case no rotational torque is generated, and rotor 30 remains in this position. Rotor 30 is held in this position, protected against rotation, with a relatively low holding current in coil of pole 2. This position can also be referred to as an "aligned" position, and it corresponds to the holding function in a direct-current motor when the holding brake is applied. The motor current delivered to the motor as the braking current is now greatly reduced once a locked position has been reached, as long as the locking torque is desired in the context of the holding brake function.

The present invention thus advantageously makes use of a property of the motor that in and of itself is troublesome for the rotating motor, but here is converted into a useful function and is utilized as such.

The magnitude of the holding current to be established depends on the instantaneous motor torque, the spindle that may be provided and the linkage that may be provided, and in general on the hysteresis in the drive system. Experiments and estimates have shown, however, that it can be less than 10% of the regulated maximum current in order to guarantee an effective holding brake function. Such a significant decrease in the power dissipation thus leads to the desired thermal relief for the motor. It is thus possible to dispense with a separately mounted mechanical or electromechanical holding brake.

If motor 10 is in an intermediate position (not depicted), i.e. if neither of the stator poles A or B is aligned with one of pole pairs 1, 2, or 3, and the holding brake function is activated, rotor 30 is displaced into the closest aligned position. This slight change in position does result in a shift in the force acting on the brake, but because of its small magnitude and in that specific operating state, it is tolerable. For example, with a caliper characteristic curve of 15 kN/mm, the resulting change in force is 125 N at a 30° angle, with a 2 mm spindle and 20 mm linkage.

The motor depicted in the FIGURE has twelve stable positions and can thus be electrically locked in position every 30°. The number of positions depends on the number of poles of rotor 30 and stator 20.

In the particular operating situation in which the holding brake also implements the parking brake, generally known as the handbrake, a separate holding brake cannot be dispensed with. The outlay is nevertheless reduced by 50%, since the holding brake needs to be installed only where the handbrake acts, i.e. for example only on the rear wheels of a motor vehicle.

The advantages of the electrical brake described above, in which an electronically commutated direct-current motor can also be used in place of the reluctance motor that is depicted, lie in the elimination of an additional holding brake and the thermal relief that can simultaneously be achieved. The holding brake function is achieved by moving to an aligned position and then reducing the current. There are no dead times for the control system due to activation and release of a separate holding brake. There is no overlap between motor energization and immobilization of the motor by a separate holding brake. Reliability is enhanced by the elimination of components, the mechanical drive design is simplified, and there is a reduction in actuator mass and a decrease in overall volume.

What is claimed is:

1. An electromechanical brake for a motor vehicle equipped with a holding brake function, comprising:
    an electric motor having salient stator poles and rotor poles, the electric motor being acted upon by a defined holding current in such a way that the stator poles and the rotor poles are one of: (a) brought into a locked position and held in the locked position, or (b) held in the locked position.

2. The brake according to claim 1, further comprising means for decreasing the current provided to the electric motor upon an activation of the holding brake function and after the locked position has been reached.

3. The brake according to claim 1, wherein the defined holding current is less than 10% of a regulated maximum current.

4. The brake according to claim 1, wherein the electric motor is a reluctance motor.

5. The brake according to claim 1, wherein the electric motor is an electronically commutated direct-current motor.

6. The brake according to claim 1, wherein the brake acts via a spindle and a linkage on a brake caliper, the electric motor operating on the spindle.

7. The brake according to claim 1, wherein the electric motor is associated with spindles, axles or wheels on which a parking brake or handbrake does not act.

8. A method for operating an electrical brake that includes a braking motor having a holding brake function, comprising the steps of:
    activating the holding brake function when a braking current is applied for a long period of time; and
    acting upon the motor with a defined holding current in such a way that poles of the motor are one of (a): brought into a locked position and held in the locked position, or (b) held in the locked position.

9. The method according to claim 8, further comprising the step of:
    when the holding brake function is activated and once the locked position has been reached, decreasing a current delivered to the motor for braking to the holding current.

10. The method according to claim 8, wherein the steps are performed with respect to spindles, axles or wheels on which a parking brake or handbrake does not act.

11. An electromechanical brake for a motor vehicle equipped with a holding brake function, comprising:
    an electric motor having salient stator poles and rotor poles, each of the stator poles having a coil winding, the electric motor being acted upon by a defined holding current in such a way that the stator poles and the rotor poles are one of: (a) brought into a locked position and held in the locked position, or (b) held in the locked position.

12. The brake according to claim 11, wherein the coil winding is located adjacent the salient stator pole and not adjacent to the rotor pole.

\* \* \* \* \*